3,156,653
TRANSMISSION FLUID
Edward G. Foehr, San Rafael, Calif., assignor to California Research Corporation, San Francisco, Calif., a corporation of Delaware
No Drawing. Filed Sept. 29, 1961, Ser. No. 141,606
4 Claims. (Cl. 252—78)

This invention relates to power transmission fluids. Specifically, this invention concerns transmission fluids containing di-N-acylsarcosine salts of aryl amines which give improved friction control characteristics in automatic power transmission systems.

Fluids for use in automatic power transmission must be carefully designed to meet a variety of requirements. The majority of types of automatic transmissions contain planetary gears which are actuated by vertical metal disks, known as "driven disks," which are alternated with vertically spaced "driving disks." The "driving disks" are faced with hard fibrous material, such as brake band material or compressed composition paper. All are immersed in a suitable transmission fluid. During the driving operation the fiber faced disks and the plain metal disks come intermittently into clutching contact with each other, and thus effect change in gear ratios corresponding to the various driving velocities. A transmission fluid is not fully satisfactory if it allows disks to grab or stick and then slip with perceptable vibration of the transmission. This phenomenon is called "squawking" or "chattering." If, however, the transmission fluid is too "oily" the disks will slip upon clutching causing excessive engine speeds or "flaring" which in turn cause an automatic upshift of gears and a jerking motion of the car.

Prior art friction control agents have in some instances consisted of compositions obtained by reaction of unsaturated compounds with elemental sulfur. These compounds generally have been unsatisfactory, since they have a detrimental effect upon the other types of additives which may be present in the transmission fluid. Other known prior art friction control additives decomposed or lost their friction control properties within a short time.

It has now been discovered that di-N-acylsarcosine salts of aromatic diamines possess outstanding properties which are considered desirable for friction control in modern automatic power transmissions. When added to an automatic transmission base fluid they eliminate both "squawk" (or "chattering") and "flaring" in the automatic power transmissions found in modern vehicles.

The di-N-acylsarcosine salts of aryl amines of the present invention are represented by the empirical formula:

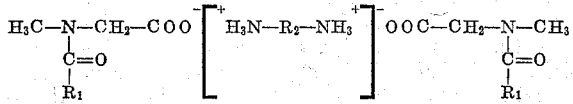

wherein $R_1$ represents the hydrocarbon group of an aliphatic carboxylic acid of about from 11 to 24 carbon atoms in the acid residue. Saturated and unsaturated acyl groups of 12 to 20 carbon atoms are preferred. These include, among others, acids of dodecene, tridecene, tetradecene, pentadecene, hexadecene, heptadecenes, octa- and nonadecene, as well as the acids of eicosenoic homologues and the corresponding alkanoic acids. Acyl groups derived from acids such as lauric, palmitoleic and oleic are included. Acyl groups from oleic acid are preferred. $R_3$ represents an aromatic group. Mononuclear aryl groups are preferred. The especially effective di-N-acylsarcosine salts are those of primary diamines having an aromatic ring and a total of 6–8 carbon atoms. These amines include, among others, o-phenylenediamine, m-phenylenediamine, p-phenylenediamine, aminobenzylamines, where the amine radicals are oriented in the available ortho, meta and para positions, diaminotoluenes, xylylenediamines, and diaminoxylenes with the orientation of the amine containing moieties likewise in the available ortho, meta and para positions.

In accordance with this invention power transmission fluids are provided having a viscosity within the range from about 75 to 1000 SSU at 100° F. and from about 35 to 750 SSU at 210° F. The base oils are light lubricating oils and ordinarily have a viscosity of about 50 to 400 SSU at 100° F. The base stock is a lubricating oil fraction of petroleum, either naphthenic or paraffinic base, unrefined, acid refined or solvent refined as required in the particular lubricating need. The base stock may also be a synthetic oil.

In the exemplification of compositions according to the invention, three base oils are used in preparing the blended base fluids. Base oil A is a blend of California paraffinic and naphthenic oils having a viscosity at 100° F. of 107.6 SSU and a viscosity at 210° F. of 39.7 SSU. Base oil B is a blend of Mid-Continent paraffinic and California naphthenic oils having a viscosity at 100° F. of 109.0 SSU and a viscosity at 210° F. of 39.8 SSU. Base oil C is a blend of California paraffinic and naphthenic oils having a viscosity at 100° F. of 94.0 SSU and a viscosity at 210° F. of 39.0 SSU.

The typical supplementary additives used in these fluids for the purpose of illustration have the following chemical compositions:

CONSTITUENT R

Mixed oil soluble polymerized alkyl methacrylates having an average of 12 carbon atoms in the alkyl chain and a molecular weight of about 220,000.

CONSTITUENT S

Oil-soluble copolymer comprised of monomeric constituents of alkyl methacrylate and vinyl pyrrolidone having a molecular weight of about 220,000 having mixed higher alkyl radicals in the alkyl chain.

CONSTITUENT U

Oil-soluble mixture of: (1) condensate of chlorinated paraffin wax and naphthalene having a molecular weight of 1500–3000, and (2) polymerized alkyl fumarate having 12–14 carbon atoms in the alkyl groups and a molecular weight of about 3000–8000. The ratio of the two components of the mixture is 1:1.

CONSTITUENT T

Oil-soluble polyisobutylene having a molecular weight of about 220,000.

CONSTITUENT K

Oil-soluble basic calcium petroleum sulfonate having a ratio of basic to neutral calcium of 7.3:1, and molecular weight of about 400.

CONSTITUENT N

Oil-soluble reaction product of N-methylpiperazine with quadripolymer comprised of monomeric constituents of dodecyl methacrylate, octadecyl methacrylate, polyethylene glycol methacrylate and glycidyl methacrylate in a molar ratio of about 33/17/1/1, wherein the polyethylene glycol has a molecular weight from 500 to 2500 and the molecular weight of the polymer is from 100,000 to 300,000.

Constituent R, Constituent S, Constituent T and Constituent N are added to the oil to improve the viscosity index. Constituent N and Constituent S are also added to improve detergency. Constituent U reduces the pour point of the fluid. Constituent K is a basic detergent and neutralizes acids formed in oil during use. Di-tert-butyl-p-cresol and phenyl-α-naphthylamine are oxidation inhibitors. The dimethylsilicone polymer is a foam inhibitor.

The following listed compositions illustrate the finished automatic transmission fluids in which the compounded base fluids are:

(D) Oil A containing—
Constituent K, millimoles per kilogram _____ 58.5
Constituent S _____ percent__ 3.0
Constituent T _____ do____ 3.5
Di-tert-butyl-p-cresol _____ do____ 0.4
Constituent U _____ do____ 0.2
Dimethylsilicone polymer _____ do____ 0.001

Table I presents data showing the sliding friction properties of compositions of this invention. In the examples the letters A, D, etc. refer to the above-described compositions. The fluids with the additive have been compared with a hydrocarbon oil which is a mixed base stock having about 20% of solvent refined paraffinic oil of Western origin having a V.I. (Viscosity Index) of 92 and a viscosity of 150 SSU at 100° F. and 80% solvent refined and acid treated oil of Western origin having a V.I. of about 50 and a viscosity of 80 SSU at 100° F. and containing no additives.

*Table I*

FRICTIONAL CHARACTERISTICS OF N-OLEYLSARCOSINE AMINE SALTS

| Example | Base Fluid | Amine salt | Conc. Percent | Temp., °F. | Sliding Coeff. of Friction At— | | | |
|---|---|---|---|---|---|---|---|---|
| | | | | | 0 f.p.m. | 5 f.p.m. | 10 f.p.m. | 15 f.p.m. |
| 1 | Hydrocarbon | None | | 75 | 0.181 | 0.178 | 0.179 | 0.174 |
| | | | | 176 | 0.192 | 0.160 | 0.160 | 0.160 |
| | | | | 300 | 0.230 | 0.177 | 0.162 | 0.158 |
| 2 | A | m-Phenylenediamine salt | 0.25 | 75 | 0.124 | 0.161 | 0.168 | 0.170 |
| | | | | 175 | 0.09 | 0.130 | 0.139 | 0.142 |
| 3 | A | do | 0.15 | 75 | 0.135 | 0.170 | 0.175 | 0.175 |
| | | | | 175 | 0.11 | 0.147 | 0.151 | 0.153 |
| 4 | D | p-Phenylenediamine salt | 0.25 | 75 | 0.13 | 0.180 | 0.185 | 0.185 |
| | | | | 175 | 0.09 | 0.128 | 0.144 | 0.147 |
| | | | | 300 | 0.08 | 0.120 | 0.121 | 0.123 |
| 5 | G | m-Xylylenediamine salt | 0.25 | 75 | 0.164 | 0.183 | 0.185 | 0.185 |
| | | | | 175 | 0.14 | 0.160 | 0.161 | 0.161 |
| | | | | 300 | 0.10 | 0.139 | 0.146 | 0.148 |
| 6 | D | do | 0.25 | 75 | 0.14 | 0.171 | 0.177 | 0.184 |
| | | | | 175 | 0.10 | 0.150 | 0.156 | 0.162 |
| | | | | 300 | 0.07 | 0.124 | 0.130 | 0.130 |
| 7 | E | do | 0.20 | 75 | 0.13 | 0.162 | 0.170 | 0.171 |
| | | | | 175 | 0.15 | 0.173 | 0.178 | 0.178 |
| | | | | 300 | 0.09 | 0.125 | 0.132 | 0.132 |
| 8 | A | Ethylenediamine salt | 0.25 | 70 | .14 | 0.164 | 0.169 | 0.170 |
| | | | | 175 | .08 | 0.129 | 0.138 | 0.144 |
| | | | | 300 | .14 | 0.135 | 0.131 | 0.131 |
| 9 | G | None | | 75 | 0.210 | 0.178 | 0.180 | 0.175 |
| | | | | 176 | 0.178 | 0.160 | 0.160 | 0.160 |
| | | | | 300 | 0.164 | 0.177 | 0.162 | 0.159 |

(E) Oil B containing—
Constituent K, millimoles per kilogram _____ 53.0
Constituent N _____ percent__ 2.0
Constituent T _____ do____ 4.75
Di-tert-butyl-p-cresol _____ do____ 0.4
Constituent U _____ do____ 0.2
Dimethylsilicone polymer _____ do____ 0.001

(F) Oil C containing—
Constituent K, millimoles per kilogram _____ 58.5
Constituent S _____ percent__ 3.0
Constituent T _____ do____ 3.6
Di-tert-butyl-p-cresol _____ do____ 0.4
Dimethylsilicone polymer _____ do____ 0.001

(G) Oil B containing—
Constituent K, millimoles per kilogram _____ 105.0
Constituent T _____ percent__ 6.2
Constituent R _____ do____ 1.0
Di-tert-butyl-p-cresol _____ do____ 0.3
Phenyl-α-naphthylamine _____ do____ 0.2
Constituent U _____ do____ 0.2
Dimethylsilicone polymer _____ do____ 0.001

The particular additives and the base oil can be combined in a variety of weight ratios with respect to each other. For instance, the ratio of Constituent K may vary from 30 to 250 millimoles per kilogram of the base oil; Constituent N and Constituent S may vary from 1.0 to 15% by weight of base oil; Constituent T may vary from 1.0 to 15% by weight of base oil; Constituent U may vary from 0.1 to 1.0% by weight of the base oil; di-tert-butyl-p-cresol may vary from 0.1 to 1.0% by weight of the base oil; phenyl-α-naphthylamine may vary from 0.1 to 1% by weight of base oil; dimethylsilicone may vary from 0.0008 to 0.01% by weight of the base oil. The amount of di-N-acylsarcosine salt added to the transmission fluid may vary from 0.10% to .75% based on weight of the compounded fluid, an amount from 0.15 to 0.30% is preferred.

The data in Table I were obtained by taking a piece of the commercial clutch plate facing (a combination of cork and composition paper) and testing it under the temperature velocity conditions in a low load friction apparatus. The apparatus consists of rotating steel disks of the type found in automatic transmissions. The fluid tested surrounds the disk while the clutch facing material is held against the disk by a constant load. As hereinafter disclosed the test results correlate with results obtained in standard test transmission under actual driving conditions.

Experience has shown that in an acceptable fluid the coefficient of friction must decrease as the rubbing speed decreases at any given temperature. The coefficient of friction is determined at the veloctiy and temeprature conditions set forth in the table. The coefficient of friction should not exceed about 0.18 at low rubbing speeds or grabbing and "squawk" will occur. At the same time the coefficient of friction should be greater than about 0.06 or slipping and "flare" will occur. It has now been found that the particular di-N-acylsarcosine aromatic diamine salts have coefficients of friction above about 0.06. The coefficients of friction are also below about 0.18. The designation "f.p.m." signifies feet per minute.

It is noted that di-N-acylsarcosine aliphatic diamine salts by comparison are unacceptable, because they act in an erratic manner. This is illustrated by the test data of Example No. 8. The last example shows compounded fluid G to be unacceptable without the di-N-acylsarcosine salts of the invention because of the reverse trend of the coefficient of friction.

The friction properties of the novel fluids are superior to those of hydrocarbon oil by reason of the reverse coefficients of friction at low temperatures. The transmission fluids containing the di-N-acylsarcosine salts of the invention possess temperature-velocity-coefficient of friction variables which are satisfactory for use in automatic transmissions.

The outstanding di-N-acylsarcosine salts of aryl amines of this invention were evaluated according to the commercially accepted standard tests which correspond to actual driving conditions encountered on the road. The test procedure was conducted by following the Durability Tests specified by General Motors Corporation, Type A Suffix A Test for automatic transmission fluids. Briefly, according to this procedure a certain model power transmission unit of an Oldsmobile car driven by an Oldsmobile engine is employed. This power transmission unit goes through a maximum throttle acceleration to 4500 r.p.m. and is then allowed to go to idle operating conditions. This cycle is repeated 2400 times. The "squawk" or "chatter" phenomenon is determined by the audible noise and the vibrational characteristics of the power transmission unit. The engine "flare" is determined by the monitored engine characteristics. During and at the end of the test an acceptable fluid does not exhibit either "squawk" or "flare" phenomenon. According to this test, the compounded fluids with di-N-acylsarcosine salts performed outstandingly, meeting all the imposed requirements.

The power transmission fluid of Example 6, Table I was also tested in a car with a hydramatic power transmission unit. Briefly, the method of testing was as follows. Previous fluid in the automatic transmission was drained, and the transmission was flushed several times with straight base hydrocarbon stock. Then the car was put into "low" hydramatic power setting for fast acceleration so that the transmission goes through two gear ratio shifts. This was repeated, until there was a perceptible vibration and an audible noise of "squawk." Next, the base stock was drained, and the compounded oil with a di-N-acylsarcosine salt of Example 6 introduced in the transmission. The car was then put into "low" hydramatic power setting for fast acceleration, the transmission going through two gear ratio shifts. This was repeated for several cycles, until the transmission fluid reached 180° F. the normal operating temperature.

Oils with poor anti-squawk properties can be identified within two or three cycles. Moderately, good oils require as many as 10 cycles to produce a trace of squawk, and oils which passed were cycled as many as twenty times without a trace of squawk or vibration. The fluid of Example 6 passed all the requirements and did not exhibit any squawk or flaring after more than twenty cycles.

I claim:
1. A power transmission fluid consisting essentially of a mineral lubricating oil having a viscosity of from about 50 to 400 SSU at 100° F., and from 0.1% to 0.75% by weight of an aromatic primary diamine salt of N-acyl sarcosine of the general formula:

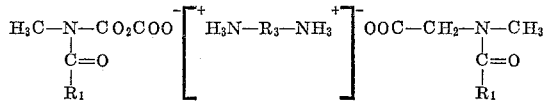

wherein $R_1$ represents the hydrocarbon group of an aliphatic carboxylic acid of from about 11 to 24 carbon atoms in the acid residue and $R_3$ represents an aromatic hydrocarbon radical containing from 6 to 8 carbon atoms, said power transmission fluid having a viscosity of from about 75 to 1000 SSU at 100° F.

2. The power transmission fluid of claim 1 which also contains (A) as a viscosity index improver, from 1.0 to 15.0% by weight of base oil of an oil-soluble copolymer of monomeric constituents of alkyl methacrylate and vinyl pyrrolidone having a molecular weight of about 220,000, said copolymer having higher alkyl radicals in the alkyl chain, (B) as a foam inhibitor, from 0.0008 to 0.01% by weight of base oil of dimethyl silicone polymer, and (C) as an oxidation inhibitor, from 0.1 to 1% by weight of base oil of di-tert-butyl p-cresol.

3. The power transmission fluid of claim 1 which also contains as a viscosity index improver, from 1.0 to 15% by weight of base oil of a mineral oil-soluble polymer of alkyl methacrylate having an average of 12 carbon atoms in the alkyl chain and a molecular weight of about 220,000.

4. The power transmission fluid of claim 1 which also contains as a viscosity index improver from 1.0 to 15.0% by weight of oil soluble polyisobutylene having a molecular weight of about 220,000.

References Cited in the file of this patent
UNITED STATES PATENTS

| | | |
|---|---|---|
| 2,841,555 | Lyons et al. | July 1, 1958 |
| 2,851,421 | Manteuffel et al. | Sept. 9, 1958 |
| 2,961,404 | Francis | Nov. 22, 1960 |

FOREIGN PATENTS

| | | |
|---|---|---|
| 856,773 | Germany | Nov. 24, 1952 |

UNITED STATES PATENT OFFICE
CERTIFICATE OF CORRECTION

Patent No. 3,156,653                  November 10, 1964

Edward G. Foehr

It is hereby certified that error appears in the above numbered patent requiring correction and that the said Letters Patent should read as corrected below.

Column 6, lines 8 to 11, for the upper left-hand portion of the formula reading:

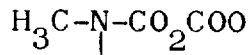        read        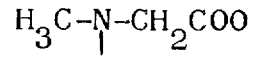

Signed and sealed this 13th day of April 1965.

(SEAL)
Attest:

ERNEST W. SWIDER                  EDWARD J. BRENNER
Attesting Officer                     Commissioner of Patents